United States Patent [19]

Weigel et al.

[11] Patent Number: 5,993,710
[45] Date of Patent: Nov. 30, 1999

[54] CELLULOSIC MOLDING PROCESS AND CELLULOSIC MOLDINGS

[75] Inventors: Peter Weigel, Kleinmachnow; Hans-Peter Fink; Hans Joachim Purz, both of Teltow; Konrad Frigge, Potsdam; Ulrich Wachsmann, Elsenfeld; Martin Nywalt, Obernburg, all of Germany

[73] Assignee: Fraunhofer-Gesellschaft zur Forderung der Angewandten Forschung e.V., Germany

[21] Appl. No.: 08/860,931

[22] PCT Filed: Dec. 22, 1995

[86] PCT No.: PCT/DE95/01864

§ 371 Date: Jan. 9, 1998

§ 102(e) Date: Jan. 9, 1998

[87] PCT Pub. No.: WO96/20301

PCT Pub. Date: Jul. 4, 1996

[30] Foreign Application Priority Data

Dec. 23, 1994 [DE] Germany .............................. 44 46 491
Feb. 10, 1995 [DE] Germany ............................ 195 04 449

[51] Int. Cl.$^6$ ........................................................ D01F 2/02
[52] U.S. Cl. ........................ 264/101; 264/187; 264/210.8; 264/211.14; 264/211.17; 106/200.1; 106/200.2; 106/200.3
[58] Field of Search .................................... 264/101, 187, 264/210.8, 211.14, 211.17; 106/200.1, 200.2, 200.3

[56] References Cited

U.S. PATENT DOCUMENTS 4,426,228  1/1984  Brandner et al. ........................ 106/203
5,792,399  8/1998  Mervert et al. .......................... 264/101

Primary Examiner—Elli Peselev
Attorney, Agent, or Firm—Locke Reynolds LLP

[57] ABSTRACT

The invention pertains to a process for manufacturing cellulose molded members wherein a solution dissolved in amine oxides is shaped in a nozzle and the shaped solution is led after an air gap into a precipitation medium. The molded solution is passed successively through at least two precepitation media, which are selected so that a slower coagualation takes place at least in the first precipitation medium than the final precipitation medium.

13 Claims, 4 Drawing Sheets

2 μm

1 μm

CELLULOSIC MOLDING PROCESS AND CELLULOSIC MOLDINGS

This application is a 371 of PCT/DE95/01864, filed Dec. 22, 1995.

The invention relates to a method of manufacturing cellulosic moulded members in which a solution containing cellulose dissolved in amino oxides is shaped in a nozzle and the shaped solution is led after an air gap into a precipitation medium. The invention relates in addition to a cellulosic moulded member, produced by shaping a solution containing cellulose dissolved in amino oxides.

Within the framework of the present invention, cellulosic moulded members are understood to be especially fibres such as fibres of finite length, for example staple fibres, but also filaments which are generally combined into yarns. However, films and membranes are also understood to be cellulosic moulded members, the membranes being used in the form of flat membranes and hollow fibre membranes for mass transfer and/or heat exchange, for example in dialysis or oxygenation.

Because of high investment costs and especially because of the great strain on the environment, there is considerable interest in finding alternatives to the viscose process by which at present the majority of cellulose regenerated fibres are manufactured. One of the most promising processes is the spinning of solutions of cellulose in amino oxides, preferably in N-methyl-morpholine-N-oxide (NMMNO), not least because with this process the complicated path via a derivatisation of the cellulose is avoided. It is known that cellulose is soluble in a NMMNO-water system and can be processed into textile fibres by spinning into a mostly aqueous NMMNO-solution (DE 28 30 685, DD 142 898, EP 0 490 870).

High strengths and moduli are characteristic for the fibres produced by the NMMNO process in comparison with viscose fibres. Thus the ultimate tensile strengths lie generally in an approximate range of about 20 to 50 cN/tex and the initial moduli in a range above about 1,500 cN/tex. This means that the strengths are pleasingly high, but often higher than necessary and the moduli clearly too high for some applications in the area of textile fibres with good properties for textile use, in which area the usual viscose fibres which have proved their worth for textile use in clothing have been used with initial moduli clearly below 1,500 cN/tex.

Although the NMMNO process is already being used in commercial production and the fibres produced by this method have proved to be successful for some textile applications, the latter show a number of differences in comparison with the fibres manufactured by the viscose process and cannot therefore be used in textiles in the usual fashion. They show, amongst other things, brittleness and a tendency to fibrillate in the wet state. Also, the values achieved for breaking elongation are not satisfactory. What proves to be disadvantageous, too, is that the variation range of the textile physical characteristic values, when the manufacturing conditions are changed, is small.

Chanzy et al. (Polymer 31 (1990), 400–405) showed a possible way of influencing the strength and modulus of fibres by adding inorganic salts, such as e.g. ammonium chloride or calcium chloride to the NMMNO spinning solution of the cellulose. A clear increase in strength and modulus is achieved by this. The fibres tend therefore even more to brittleness and fibrillation. Fibres of this type, which show the typical behaviour of high-strength, high-modulus fibres, are eminently suitable for many technical purposes, especially in the form of composites in a fixed matrix, but cannot be used in textiles as widely as usual.

A possible way of reducing the modulus to a limited extent, and thus the brittleness of the fibres, consists in using, instead of the precipitation bath generally used and consisting of an aqueous NMMNO solution, a solution of NMMNO in isopropanol or amyl alcohol (SU 1 224 362) or adding certain hydrophilic additives both to the spinning solution and to the precipitation bath. The very slight reduction in strength occurring here can be tolerated since the fibres still have strengths which correspond to those of viscose fibres. Seen overall, these processes still, however, leave something to be desired both in respect of the brittleness of the fibres and in respect of the possibility of controlling the textile physical characteristic values of the fibres by altering the manufacturing conditions.

The special properties of the fibres manufactured by the amino oxide process are characterised by structural peculiarities, it being possible to observe a more compact precipitation structure in relation to textile viscose fibres, with increased crystallinity and chain orientation, as well as an altered form of crystallite (J. Schurz et al., Lenzinger Berichte 9/94, p. 37, H. P. Fink et al., Proceedings of the Akzo-Nobel Viscose Chemistry Seminar "Challenges in Cellulosic Man-made fibres", Stockholm 1994). The above-mentioned possible ways of changing modulus and brittleness can be here traced back to correspondingly changed fibre structures (M. Dubé, R. H. Blackwell, TAPPI proceedings 1983 "International Dissolving and Specialty Pulps", p. 111, P. Weigel et al., Lenzinger Berichte 9/94, p. 31). What should also be taken into account here is the fact that the cavity structure of the thread set in the manufacturing process helps to determine its dyeing behaviour.

In summary, it can thus be established that there is still a central problem in manufacturing flexible cellulose fibres with low brittleness and tendency to splinter and in influencing the spinning process in such a way that fibres can be produced by this process which cover the whole range of application of textile viscose fibres.

The object of the present invention is, therefore, to make available a method of manufacturing cellulosic moulded members with which it is possible purposefully to improve the characteristics of the moulded members. A further purpose consists in proposing new cellulosic moulded members; in particular, cellulosic fibres are to be made available which have low brittleness and do not splinter easily, i.e. have a reduced tendency to fibrillate in relation to the known fibres.

This object is achieved in relation to the method by the features of claim 1 and in relation to the cellulosic moulded member by the features of claim 11. The secondary claims expound advantageous developments.

The method according to the invention for manufacturing cellulosic moulded members (claim 1) is distinguished by the fact that a solution containing cellulose dissolved in amino oxides is shaped in a nozzle and the shaped solution is led after an air gap through at least two precipitation media in succession. It is essential here that the precipitation media are chosen to be such that, at least in the first precipitation medium, coagulation of the cellulose takes place more slowly than in the last precipitation medium. Because of this, it is now surprisingly possible for cellulosic moulded members to be manufactured which—in relation to their cross-section—have an inner region with greater strength and higher initial modulus than an external region surrounding the inner region. The inner region is characterised by a high molecule-aggregate order in the form of small, finely dispersed pores, whilst the outer region has a low molecule-aggregate order with larger heterogeneous cavities than the inner region. With cellulosic fibres a core-cladding structure is thus achieved, the interior of the fibre (core) consisting of well ordered high-strength and high modulus regions, whilst the outer sheath of the fibre (cladding) consists of less ordered flexible portions with relatively low strength and low modulus. In this way a fibre is now available whose high-strength core guarantees the desired basic characteristics, whilst the flexible cladding prevents the splitting of the fibres and provides for good flexibility and a low tendency to rupture. It is crucial in the proposed method for manufacturing cellulosic moulded members that the solution, after it comes out of the nozzle, is led through a plurality of precipitation media, preferably two, which reduce the solubility of the cellulose in amino oxide in a different way. The sojourn time in the first precipitation medium is here so short that only an outer layer of the moulded member, which is in the process of forming, coagulates, whilst the interior only coagulates in the second precipitation medium or in the following precipitation media. The different effect of the precipitation media on the dissolving behaviour of the NMMNO as opposed to cellulose causes different cellulose structures with different mechanical characteristic values to arise over the cross-section. This leads, according to the invention, to fibres with a reduced tendency to fibrillate. According to the invention, fibres with a solid core and flexible sheath are obtained if the first precipitation medium causes substantially slower coagulation of the cellulose dissolved in NMMNO than the subsequent precipitation media.

By preference, in the method according to the invention the procedure is that a solution is used containing cellulose dissolved in amino oxide in concentrations actually known. Generally, a 5 to 20% amino oxide solution is used here. By preference, a 7.5 to 15% solution is used. The work is preferably done with N-methyl-morpholine-N-oxide (NMMNO) as the amino oxide.

As precipitation media with slower coagulation in relation at least to the last precipitation bath, basically all amino oxide solvent members are suitable, if necessary also as mixtures and with further additives. Relatively slowly acting precipitating agents for the cellulose dissolved in amino oxide and thus suitable as the first precipitation medium are especially alcohols and alkanols and also higher-value, preferably aliphatic alcohols, ketones, carboxylic acids, amines and other nitrogen compounds, solutions of electrolytes and mixtures of the above mentioned compounds. However, alkanols such as butonal, amyl alcohol, hexyl alcohol and other higher molecular alcohols or mixtures of same are preferred. For the last precipitation medium which substantially determines the structure in the interior of the moulded member, water or an aqueous amino oxide solution is used by preference.

The method can be carried out in principle with a plurality of the above-described precipitation media, it always, however, being presupposed that at least the first precipitation media cause slower coagulation than the last precipitation medium, so that the above-described moulded members are produced.

In experiments it has been shown to be sufficient to work with two precipitation media.

If the density of the solvent of the first precipitation medium is lower than the density of the second precipitation medium, and if the two precipitation media may be mixed together not at all or only slightly, the procedure according to the invention can be for the two precipitation media to be layered one above the other in one container. This is true, for example, of alkanols with increasing molecular weight from hexyl alcohol or a mixture of same as first precipitation medium, and water or an aqueous amino oxide solution as second precipitation medium. In this way, the sojourn time in the first precipitation medium can be very simply set by the pull-off speed and the layer thickness of the upper precipitation medium. According to the invention, the structure of the outer portion of the moulded member can thus be influenced by the choice of the solvent in the first precipitation medium, and the structure of the inner region by the solvent in the last precipitation medium, whilst the thickness of the outer region is determined by the sojourn time in the first precipitation medium. This makes possible an extensive variation of the physical characteristics of the cellulosic moulded members produced by means of the amino oxide process.

The invention relates in addition to cellulosic fibres with a core-cladding structure (claim 14). These fibres are characterised by the fact that the structure of the cellulose near the fibre surface (cladding) is different from the structure in the interior of the fibre (core) and the fibres thus have a reduced tendency to fibrillate. The fibres according to the invention have in their core region a substantially higher ordered structure than in the cladding region. This leads to the cellulose regions in the core of the fibres having high strength and a high initial modulus, whilst the cladding regions have high flexibility and low brittleness with lower strength and lower initial modulus. The high-strength core of the fibre thus guarantees great strength, whilst the flexible cladding reduces the tendency to rupture and the brittleness of the fibres, and provides for good flexibility. The fibres according to the invention have here an ultimate tensile strength in the dry state of 15 to 50 cN/tex and in the wet state of 10 to 30 cN/tex. The initial modulus lies in the region of 1,000 to 2,500 cN/tex (dry) or 60 to 300 cN/tex (wet). Durability in the water jet when pre-stressed to the extent of 80% of the wet tenacity is greater than 6,000 s.

These cellulosic fibres can be by preference manufactured by a method described above.

The method according to the invention is also particularly advantageously suited to the manufacture of membranes, especially hollow fibre membranes. In the manufacture of hollow fibres a hollow fibre spinneret is used through which the spinning solution and an inert fluid to form the inner cavity are extruded.

Hollow fibres according to the invention are characterised in that their walls have regions with different strength and different initial modulus. The inner region of the wall has a high molecule-aggregate order in the form of small, finely-dispersed pores. The outer wall region has a low molecule-aggregate order with larger heterogeneous cavities than the inner region.

The outer wall region of the hollow fibres according to the invention assumes a supporting function and its greater pores cause good throughput. The actual separating effect is taken on by the inner, fine-pored region. A membrane of this kind guarantees in an advantageous manner an increase in permeability without loss of the actual separating effect.

Flat membranes according to the invention also offer this advantage. On these, the region with the finely dispersed pores is configured not ring-shaped but flat and is surrounded externally by likewise flat regions with greater heterogeneous cavities which have the function of a supporting layer. Here, too, separation is effected by the fine pore region and, because of the latter's comparative thinness, a high permeability rate of the membrane results.

Further details and features of the invention arise from the following description of the embodiments, given by way of example, and with the aid of the diagrams. These show:

EXAMPLE 1

(1st comparative example according to the state of the art)

Figure 1:
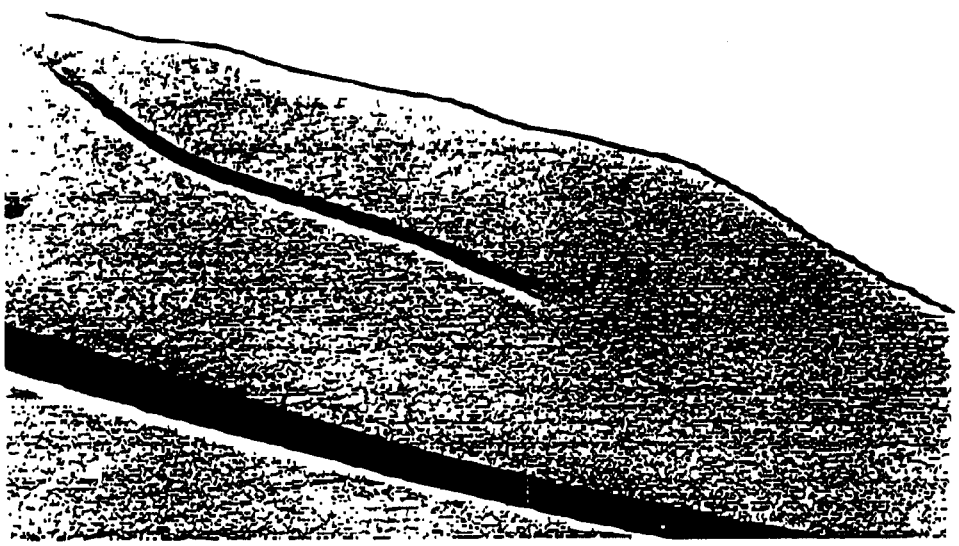
FIG. 1 an electron-microscopic (TEM) photograph of the fibre cross-section (detail) of a cellulosic fibre made of amino oxide solution and precipitated in water.

A spinning solution of 9% cellulose in NMMNO-monohydrate with 0.1 mass-% in relation to cellulose propyl gallate as stabilizing agent was spun in a laboratory extruder with a 60-hole nozzle at a temperature of 90° C., a 10% solution of NMMNO in water being used as precipitation medium. The fibres have the following parameters:
Titre: 11.8 tex
Tensile strength, dry: 33.9 cN/tex wet: 24.3 cN/tex
Elongation at break, dry: 8.7% wet: 10.4%
Initial modulus, dry: 2078 cN/tex wet: 308 cN/tex
Durability in the water jet when pre-stressed to the extent of 80% of the wet tear strength: 55 s The TEM photograph of the fibre cross-section (FIG. 1) shows a precipitation structure with high molecule-aggregate order and pores distributed finely dispersed.

EXAMPLE 2

(2nd comparative example according to the state of the art)

Figure 2:
FIG. 2 a TEM photograph of the fibre cross-section (detail) of a cellulosic fibre made of amino oxide solution and precipitated in hexyl alcohol and FIG. 3 a TEM photograph of the fibre cross-section (detail) of a cellulosic fibre made of amino oxide solution and precipitated in hexyl alcohol/water.

As example 1, with hexyl alcohol being used as the precipitation medium.
Titre: 13.7 tex
Tensile strength, dry: 11.7 cN/tex wet: 3.2 cN/tex
Elongation at break, dry: 8.5% wet: 32.6%
Initial modulus, dry: 800 cN/tex wet: 45 cN/tex
Durability in the water jet when pre-stressed to the extent of 80% of the wet tear strength: 8350 s The TEM photograph of the fibre cross-section (FIG. 2) shows a precipitation structure with low molecule-aggregate order and large heterogeneous cavities.

EXAMPLE 3

Figure 3:
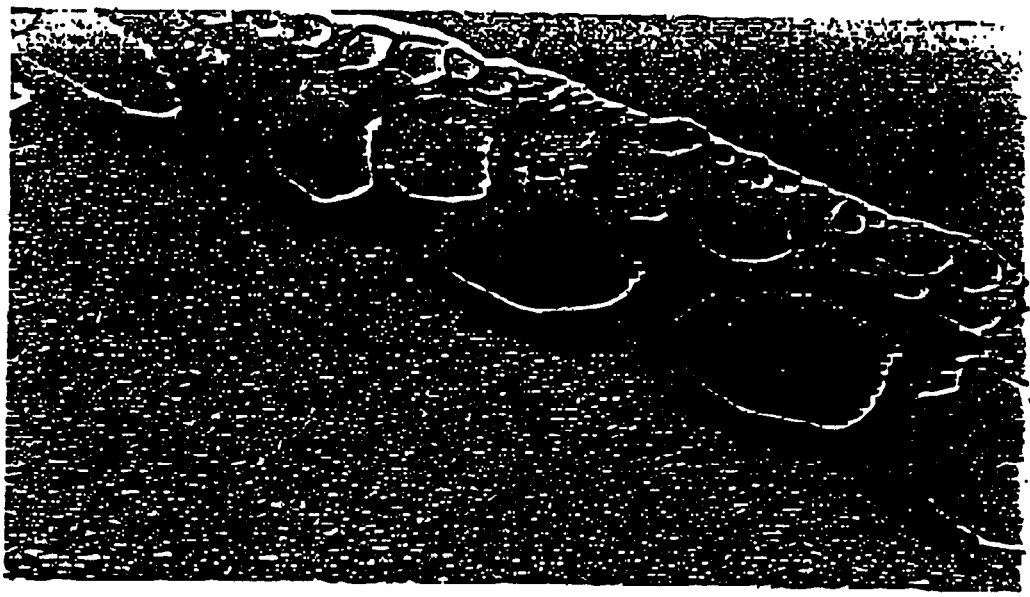

As example 1, a 10% solution of NMMNO in water being used as precipitation medium, over which solution a 100 mm thick layer of hexyl alcohol was arranged.
Titre: 12.4 tex
Tensile strength, dry: 24.3 cN/tex wet: 13.2 cN/tex
Elongation at break, dry: 12.5% wet: 40.1%
Initial modulus, dry: 1530 cN/tex wet: 120 cN/tex
Durability in the water jet when pre-stressed to the extent of 80% of the wet tear strength: 8140 s The TEM photograph of the fibre cross-section (FIG. 3) shows a core-cladding structure: in the edge region 2 low molecule-aggregate order with large heterogeneous cavities and in the core 1 high molecule-aggregate order with small pores distributed finely dispersed.

EXAMPLE 4

As example 3, with a mixture of 90% hexyl alcohol and 10% isopropanol being used instead of hexyl alcohol in the upper layer of the precipitation medium.
Titre: 11.8 tex
Tensile strength, dry: 26.4 cN/tex wet: 15.3 cN/tex
Elongation at break, dry: 14.8% wet: 45.3%
Initial modulus, dry: 1410 cN/tex wet: 95 cN/tex
Durability in the water jet when pre-stressed to the extent of 80% of the wet tear strength: 6320 s.

EXAMPLE 5

(Comparative example)

A spinning solution of 12% cellulose in approx. 76% NMMNO and 12% water with 0.1 mass % in relation to cellulose propyl gallate as stabilizing agent, was spun at a nozzle temperature of 120° C. to a hollow fibre, water being used as precipitation medium. After being washed, the hollow fibres were treated with a reviving agent composed of 20% glycerine and 80% water and then dried. The hollow fibre has an ultrafiltration rate for water of 12 ml/m$^2$h torr.

EXAMPLE 6

Hollow fibres were manufactured—as explained under example 4—with, however, water, over which a 24 mm thick layer of hexyl alcohol was arranged, being used as precipitation medium. The hollow fibre manufactured according to the invention has an ultrafiltration rate for water of 20 ml/m$^2$h torr.

EXAMPLE 7

As example 6, with water, over which a 60 mm thick layer of hexyl alcohol was arranged, being used as precipitation medium. The hollow fibre manufactured according to the invention has an ultrafiltration rate for water of 22 ml/m$^2$h torr.

Figure 4:
FIG. 4 a TEM photograph with a 32,500-fold enlargement of the cross-section in the outer wall region of a cellulosic hollow fibre made of amino oxide solution and precipitated in hexyl alcohol/water.

The TEM photograph of the cross-section (FIG. 4) shows from the inner wall outwards an even compact pore structure. In the region of the last three micrometres on the outer wall is found a system of very large pores which are closed off towards the outside with a skin.

These examples show that the hollow fibres manufactured according to the invention (examples 6 and 7) have a clearly increased flow rate for water in comparison to a hollow fibre in the manufacture of which only water was used as precipitation medium (example 5). The hollow fibres manufactured according to the invention are thus advantageously characterised by an increased permeability.

We claim:

1. Method of manufacturing cellulosic moulded members in which a solution containing cellulose dissolved in amino oxides is shaped in a nozzle and the shaped solution is led after an air gap into a precipitation medium, characterised in that the shaped solution is led through at least two precipitation media in succession, these media being so chosen that at least in the first precipitation medium slower coagulation of the cellulose takes place than in the last precipitation medium.

2. Method according to claim 1, characterised in that the sojourn time in the precipitation media with slower coagulation than the last precipitation medium being chosen to be such that only the outer layer of the moulded member, which is in the process of being formed, coagulates.

3. Method according to claim 1, or 2 characterised in that a solvent for amino oxides is used for the precipitation media with slower coagulation than the last precipitation medium.

4. Method according to claim 3, characterised in that solvents are used, chosen from alkanols, such as hexyl alcohol or heptyl alcohol or octanol, higher-value alcohols such as propane diol, butane diol or glycerine, carboxylic acids, amines or other nitrogen compounds, solutions of electrolytes or mixtures of same.

5. Method according to claim 4, characterised in that alkanols which may be mixed with water not at all or only very slightly are used as solvent.

6. Method according to claim 1, characterised in that a precipitation medium which contains water or an aqueous amino oxide solution is used at least as last precipitation medium.

7. Method according to claim 1, characterised in that N-methyl-morpholine-N-oxide (NMMO) is used as amino oxide.

8. Method according to claim 1, characterised in that only two precipitation media are worked with.

9. Method according to claim 2, characterised in that a first precipitation medium which is insoluble or only very slightly soluble in water is layered over the second aqueous precipitation medium.

10. Method according to claim 8 or 9, characterised in that the sojourn time of the moulded member in the first precipitation medium is set by altering the layer height of the first precipitation medium.

11. Cellulosic moulded member, manufactured by shaping a solution containing cellulose dissolved in amino oxides, characterised in that the cellulosic moulded member, with reference to its cross-section, has an inner region with greater strength and higher initial modulus than an outer region surrounding the inner region, the initial modulus of the inner region being from about 1,000 to 2,500 cN/tex, and the initial modulus of the outer region being from about 60 to 300 cN/tex.

12. Cellulosic moulded member according to claim 11, characterised in that the inner region has a high molecule-aggregate order in the form of small, finely dispersed pores and the outer region has a small molecule-aggregate order with larger heterogeneous cavities than the inner region.

13. Cellulosic moulded member according to claim 11 or 12, characterised in that it is a fibre, a film, a membrane in the form of a flat membrane and a hollow fibre membrane.

* * * * *